US012619600B2

(12) United States Patent
Flanagan

(10) Patent No.: US 12,619,600 B2
(45) Date of Patent: *May 5, 2026

(54) SYSTEMS AND METHODS FOR SCALABLE DATABASE TECHNOLOGY

(71) Applicant: Dennis Flanagan, East Greenwich, RI (US)

(72) Inventor: Dennis Flanagan, East Greenwich, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/771,654

(22) Filed: Jul. 12, 2024

(65) Prior Publication Data

US 2025/0147952 A1     May 8, 2025

Related U.S. Application Data

(63) Continuation of application No. 16/456,787, filed on Jun. 28, 2019, now Pat. No. 12,038,909.

(51) Int. Cl.
*G06F 16/23* (2019.01)
*G06F 16/22* (2019.01)

(52) U.S. Cl.
CPC ...... *G06F 16/2379* (2019.01); *G06F 16/2282* (2019.01); *G06F 16/2365* (2019.01)

(58) Field of Classification Search
CPC ............. G06F 16/2379; G06F 16/2365; G06F 16/2282
See application file for complete search history.

(56) References Cited

U.S. PATENT DOCUMENTS

| | | | |
|---|---|---|---|
| 8,370,303 B1 | 2/2013 | Ceschim et al. | |
| 10,375,262 B2 | 8/2019 | Ogasawara | |
| 11,321,299 B2 * | 5/2022 | Bortnikov | G06F 16/2329 |
| 2011/0167038 A1 * | 7/2011 | Wang | G06F 16/27 |
| | | | 707/633 |
| 2014/0279985 A1 | 9/2014 | Fontenot et al. | |
| 2016/0127235 A1 | 5/2016 | Zourzouvillys | |
| 2016/0253372 A1 * | 9/2016 | Nguyen | G06F 16/245 |
| | | | 707/756 |
| 2017/0123934 A1 | 5/2017 | Bentley | |
| 2017/0139909 A1 | 5/2017 | Karri et al. | |
| 2017/0300519 A1 | 10/2017 | Lpez et al. | |
| 2018/0160036 A1 | 6/2018 | Chenny et al. | |
| 2018/0189346 A1 * | 7/2018 | Kharatishvili | G06F 16/24539 |
| 2018/0314238 A1 | 11/2018 | Fujita et al. | |
| 2019/0258635 A1 | 8/2019 | Pal et al. | |
| 2019/0384847 A1 | 12/2019 | Bobbala et al. | |
| 2020/0272638 A1 | 8/2020 | Motivala et al. | |
| 2020/0387514 A1 | 12/2020 | Stegmann | |
| 2020/0409749 A1 | 12/2020 | Gopalan et al. | |
| 2020/0409956 A1 | 12/2020 | Woollen et al. | |

* cited by examiner

*Primary Examiner* — Huawen A Peng
(74) *Attorney, Agent, or Firm* — HG LAW LLP

(57) ABSTRACT

Methods and systems are described for increasing scalability in cooperative processing systems by reducing issues due to contention (e.g., waiting or queueing for shared resources) and coherency (e.g., delay for data to become consistent) using reciprocal delta tables. The system allows for both proposing and committing changes to a state table without the changes being executed on the state table via recording changes in a series of transactions with delta tables. By eliminating a need to wait for unlocking of a state table as changes are executed, downtime for a client will reduce and processing can be more efficient.

20 Claims, 8 Drawing Sheets

200

300

302

| Key No. | Data Item |
|---|---|
| 1 | Lorem |
| 2 | Ipsum |
| 3 | Dolor |

350

304

| Key No. | Data Item |
|---|---|
| 1 | Update: Sit |
| 2 | |
| 3 | |

370

306

| Key No. | Data Item |
|---|---|
| 1 | Sit |
| 2 | Ipsum |
| 3 | Dolor |

400

402                                         404

| Key No. | Data Item | Revert |
|---------|-----------|--------|
| 1 | Update: Sit | Lorem |
| 2 | | Ipsum |
| 3 | | Dolor |

500

| Key No. | Data Item |
|---|---|
| 1 | Lorem |
| 2 | Ipsum |
| 3 | Dolor |

510

502

| Key No. | Data Item | Revert |
|---|---|---|
| 1 | Update: Sit | Lorem |
| 2 | | Ipsum |
| 3 | | Dolor |

520

504

| Key No. | Data Item | Revert |
|---|---|---|
| 1 | | Lorem |
| 2 | Update: Amet | Ipsum |
| 3 | | Dolor |

530

502
504

| Key No. | Data Item | Revert |
|---|---|---|
| 1 | Update: Sit | Lorem |
| 2 | Update: Amet | Ipsum |
| 3 | | Dolor |

540

| Key No. | Data Item |
|---|---|
| 1 | Sit |
| 2 | Amet |
| 3 | Dolor |

600

602

| Key No. | Data Item |
|---|---|
| 1 | Lorem |
| 2 | Ipsum |
| 3 | Dolor |

610

602

| Key No. | Data Item | Revert |
|---|---|---|
| 1 | Update: Sit | Lorem |
| 2 | | Ipsum |
| 3 | | Dolor |

620

602

| Key No. | Data Item | Revert |
|---|---|---|
| 1 | Update:Vade | Lorem |
| 2 | | Ipsum |
| 3 | | Dolor |

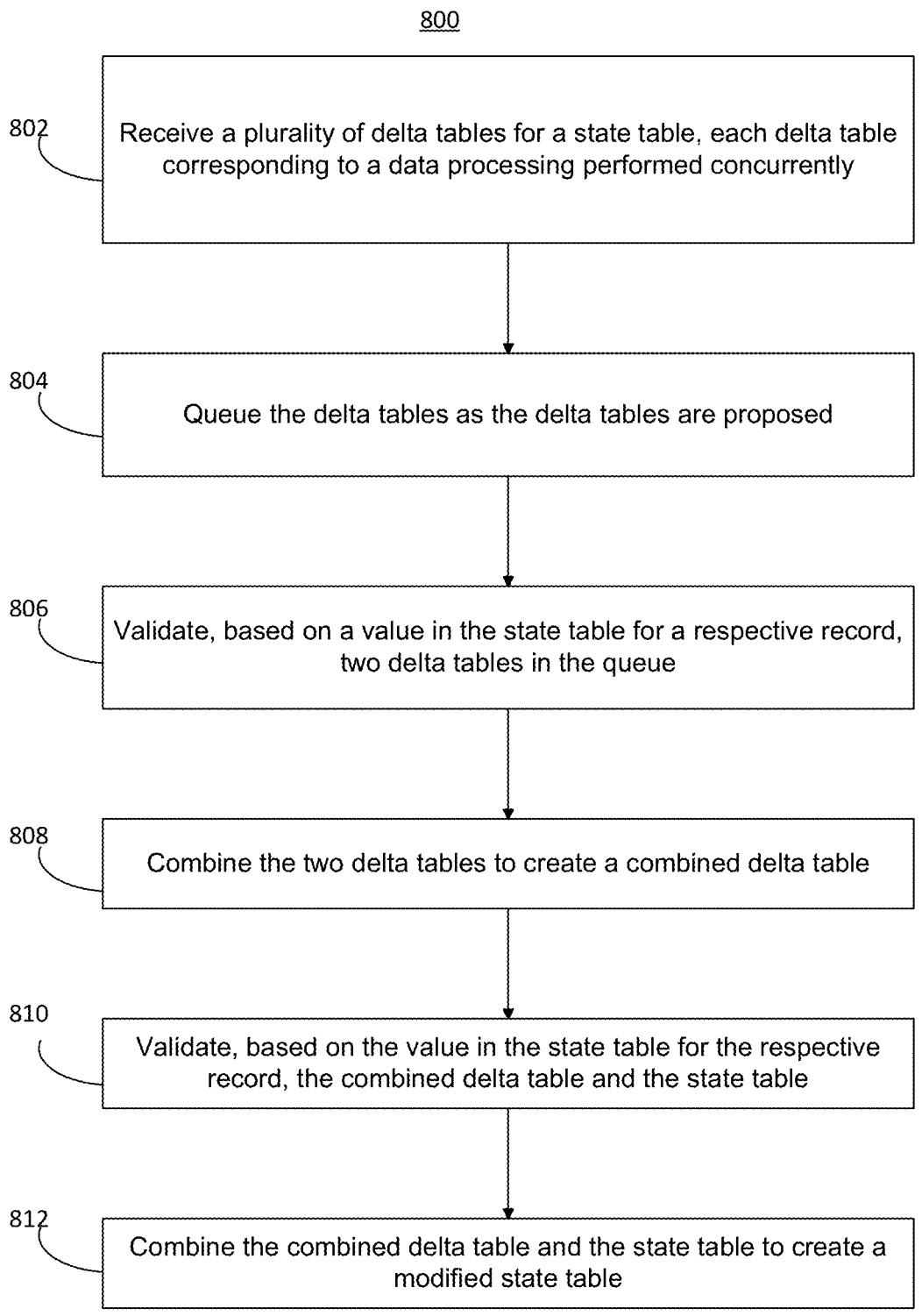

802  Receive a plurality of delta tables for a state table, each delta table corresponding to a data processing performed concurrently 804  Queue the delta tables as the delta tables are proposed 806  Validate, based on a value in the state table for a respective record, two delta tables in the queue 808  Combine the two delta tables to create a combined delta table 810  Validate, based on the value in the state table for the respective record, the combined delta table and the state table 812  Combine the combined delta table and the state table to create a modified state table

FIG. 8

SYSTEMS AND METHODS FOR SCALABLE DATABASE TECHNOLOGY

CROSS-REFERENCE TO RELATED APPLICATIONS

This patent application is a continuation of U.S. patent application Ser. No. 16/456,787 filed Jun. 28, 2019, issued as U.S. Pat. No. 12,038,909, which is hereby incorporated by reference herein in its entirety.

BACKGROUND

The background description provided herein is for the purpose of generally presenting the context of the disclosure. Work of the inventor hereof, to the extent the work is described in this background section, as well as aspects of the description that does not otherwise qualify as prior art at the time of filing, are neither expressly nor impliedly admitted as being prior art against the present disclosure.

The present disclosure relates to systems for cooperative processing, and more particularly to scalability in cooperative processing systems.

Moore's Law, which effectively states that processor speeds, or overall processing power for a computer, will double every two years, has predicted processing speeds for the last half-century. This processing power is typically tied to the number of transistors, but as the size of transistors shrinks to its physical limits (e.g., atomic scales), the increasing processing power predicted by Moore's Law appears to be approaching its limit. Likewise, the amounts of data in need of processing for evolving fields such as advanced analytics, artificial intelligence, and Big Data are exponentially increasing size.

In view of the ever-increasing demand for more processing power and the physical limitations on processing power for a given computer, one solution is to use an increasing number of processors working in parallel. For example, a given processor may break a given task into a series of sub-tasks. Each sub-task, which itself may require immense amounts of data processing, may be assigned to individual processors. However, the use of multiple processors to compensate for limits to processing power of a single computer also has limits. For example, in order to update data with reliability (e.g., in case of failure of the system and/or individual clients) and to prevent errors (e.g., from multiple clients accessing and/or modifying the data set concurrently), a system must work through proposed changes to that data through a series of transactions that are atomic, consistent, isolated and durable ("ACID"). Prior to combining, each participating dataset must be validated. Validating the datasets allows a system to detect any potential problems with field names (e.g., invalid characters in field names) as well as detecting conflicting values. For example, if conflicting values are detected, a system must resolve these values. Typically, resolving these values is based on a time-stamp or version number associated with the proposed dataset. The earlier time-stamp or version number is typically used to determine which conflicting value governs.

With respect to processes performed on a common dataset (e.g., a state table), a system may work through a queue of proposals (e.g., delta tables representing the results of sub-tasks). A delta table is a table that shows the changes with respect to the initial state table. In delta tables, each record for a proposed delta table is validated against a corresponding record of the state table. Once the values have been validated, the proposed delta table is committed, and the values of the state table are updated based on values (proposed changes) of the delta table. During this time, the state table is locked. Once a proposal is executed or committed on the initial state table, which now corresponds to the state table after the delta table is committed, the now-modified state table is released. A system retrieves the next proposed delta table in the queue, which corresponds to the next sub-task processed by the next client. To process the next sub-task, a modified state table is now released to start validation and combination process with another delta table. Thus, by working through a queue for each proposal, which corresponds to a respective sub-task, a system processes an overall task through the use of multiple parallel clients. However, because the initial state table must remain locked, as additional processors are added to a system the queue of processors waiting to access the state table increases, and the system experiences diminishing rate of return for processing power. That is, such a system experiences scalability issues due to contention (e.g., waiting or queueing for shared resources) and coherency (e.g., delay for data to become consistent).

SUMMARY

Accordingly, methods and systems are disclosed herein for increasing scalability in cooperative processing systems by reducing issues due to contention (e.g., waiting or queueing for shared resources) and coherency (e.g., delay for data to become consistent). Embodiments allow for concurrent processing without an initial dataset being locked. That is, embodiments may allow for both the proposal and committing of changes to a state table without the changes being executed on the state table. A system therefore does not need to devote processing power (or time) to executing the changes detailed in the proposal to the state table. Instead, a system may record the changes in a series of transactions. As clients do not need to wait for a state table to unlock or wait as changes are executed on the state table the amount of downtime for a client is reduced. These advantages can be achieved by making delta tables invertible. For instance, through the addition of a "revert" role to traditional delta table roles (e.g., "insert," "update," and "delete"), a system may create a reciprocal delta table.

Specifically, a "revert" role of the reciprocal delta table allows for each delta table to be self-validating. That is, a system component may validate a given reciprocal delta table without access to an initial state table. This role may be captured in a delta table in numerous ways, depending on the manner in which the delta table is depicted. For example, if a traditional delta table is formatted as a set of three tables, with each table corresponding to a specific role (e.g., "create," "delete," and "update"), a reciprocal delta table may be formatted as an additional table with the table corresponding to the specific role of "revert." For instance, a reciprocal delta table may be composed of a set of four tables, with each table corresponding to one of "create," "delete," "update," and "revert." In another example, if a traditional delta table is formatted as a single table, a reciprocal delta table may be formatted with an extra column capturing the role, which may be any of the four roles (e.g., "create," "delete," "update," and "revert"). In yet another example, a reciprocal delta table may be formatted as a single table that includes dual values, old and new, for each cell, and a null value to indicate that cell was inserted or deleted, respectively. It should be noted that in some embodiments, delta tables and/or reciprocal delta table may be converted from one format to another. It should be further noted that embodiments and examples with respect to a delta table and/or reciprocal delta tables can also be expressed, and should apply to, a delta table and/or reciprocal delta table in another format.

Furthermore, in an embodiment, a system component initiating the task (e.g., a client device) tracks where data is distributed across the network (e.g., by storing the state table and/or a pointer to the state table). A system component initiating the task (e.g., a client device) may distribute the task to different system components (e.g., servers). These different system components (e.g., servers) may generate their delta tables. The different system components (e.g., servers) either combine their delta tables and send their delta tables to a system component initiating the task (e.g., a client device) or send a delta table to a system component initiating the task (e.g., a client device) directly. The ability of a system component initiating the task (e.g., a client device) to distribute the task and the lack of a need to lock a state table increases throughput of the system by, for example, reducing loss of throughput due to contention and incoherency.

Additionally, using a revert role, and the ability of a delta table to be invertible, an embodiment may combine delta tables algebraically to create a smaller subset of delta tables to combine with a state table once it is released. Furthermore, when a system tracks sequences of committed delta tables (e.g., through the creation of delta table branches), a system may also only need to validate delta table against a state tables if a recorded sequence value of the given delta table is after the recorded sequence value of the state table. For example, preexisting deltas or tables are not required to be modified. If there is a schema mismatch, it is unnecessary to cover data missing in the delta tables or state tables because of the mismatch. To reduce time that a system component needs exclusive access to the state table further, a pointer can be affixed to any branch to indicate to other servers how to obtain recent changes. When a system component commits a branch, a pointer is placed on the state table instructing a client device to check a newly committed branch for updates. The system component can then copy those changes into a state table without blocking other system components.

Methods and systems disclosed herein relate to storing and retrieving data relations (e.g., tables) as a sequence of reciprocal deltas. A reciprocal delta may be any format that represents an algebraic difference between tables. For example, a reciprocal delta satisfies the following expressions: $D=A-B$; $A=B+D$; or $B=A-D$, in which A represents an advanced state, B represents a base state, and D represents a reciprocal delta. The properties apply to changes in any dimension such as schema (e.g., columns), distribution (e.g., rows), and version (e.g., time). Reciprocal properties enable concurrent transactions because each proposed transaction can be validated without interfering with any other transaction. If validation fails, for instance, a transaction can be repaired and retried, and the impact may be limited to one client. A transaction system based upon a reciprocal delta can maximize scaling by minimizing delays due to contention and coherency. Throughput may increase by exploiting additional processors. This is a crucial advantage because processor speed may be considered as no longer increasing, but the number of available processors continues to expand rapidly.

It should be noted, embodiments of systems and/or methods described above may be applied to, or used in accordance with, other systems, methods and/or apparatuses.

BRIEF DESCRIPTION OF DRAWINGS

Further features of the disclosure, its nature and various advantages will become apparent upon consideration of the following detailed description, taken in conjunction with the accompanying drawings, in which like reference characters refer to like parts throughout, and in which:

FIG. 6 depicts an exemplary embodiment of detecting conflicts between two reciprocal delta tables, in accordance with some embodiments described herein;

FIG. 8 illustrates a process for updating a state table using a plurality of delta tables as described in FIG. 5, in accordance with some embodiments described herein.

DETAILED DESCRIPTION

Figure 1:
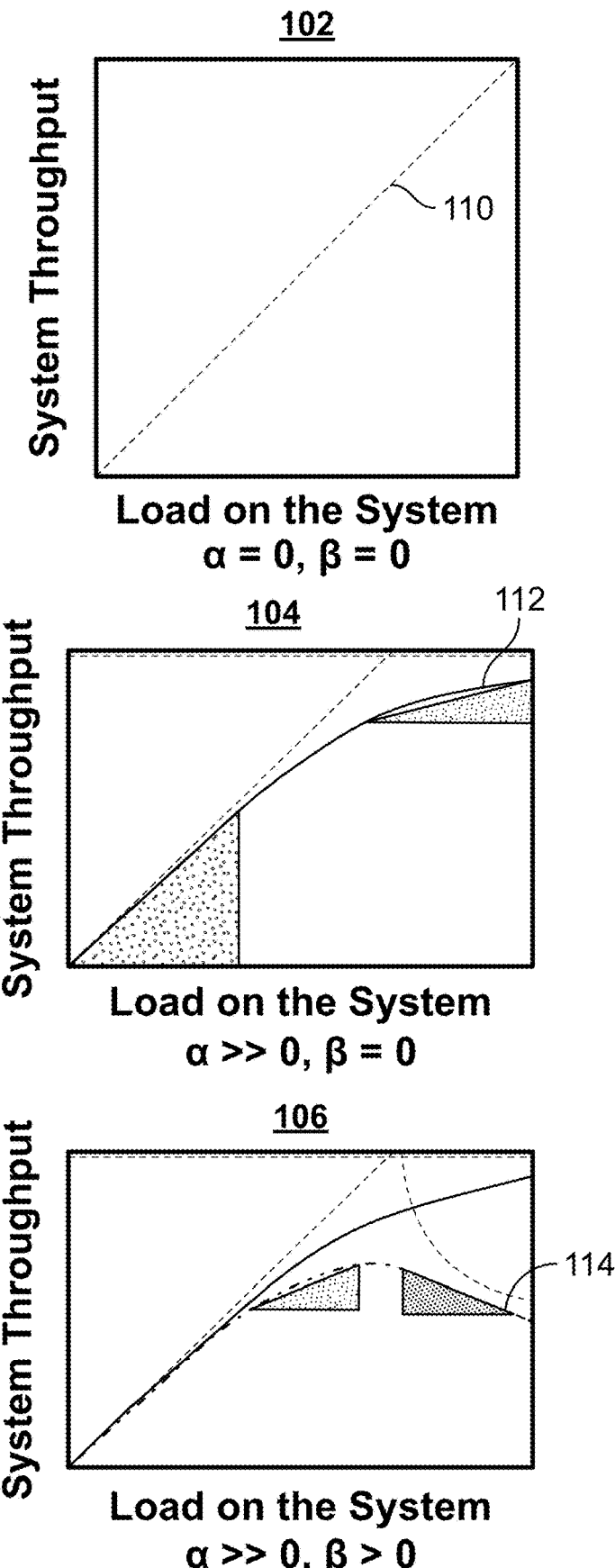
FIG. 1 depicts exemplary plots that depict the results of scaling operations and the effect of contention and incoherency.

The methods and systems disclosed may increase scalability in cooperative processing systems by reducing issues due to contention (e.g., waiting or queueing for shared resources) and coherency (e.g., delay for data to become consistent). FIG. 1 depicts exemplary plots (102, 104, and 106) that depict results of scaling operations and effects of contention and incoherency in conventional systems. As shown in plot 102, the scalability of any system may be demonstrated with respect to system throughput. For example, with the system throughput X(N) at a given load, N, the fundamental scaling effects contained in the USL (Universal Scalability Law) can be depicted schematically as:

$$\text{System Throughput}\,(X\,(N)) = \frac{yN}{1 + \alpha\,(N-1) + \beta\,(N-1)}$$

N—number of devices (Load)
y—Concurrency or ideal parallelism
α—Contention due to waiting or queueing for shared resources
β—Coherency due to the delay for data to become consistent (or coherent) by virtue of point-to-point exchange of data between resources that are distributed As shown in plot 102, X(N)=yN when α=β=0. Maximum throughput attainable with a single load generator is therefore X(1)=y. That is, the system exhibits ideal parallelism as shown by line 110. In such an example, the coefficients for concurrency and coherency are 0 (i.e., no wait for shared resources or for the data to be consistent). In this embodiment, throughput is just a factor of the number of devices involved. X(N)=yN.

However, in practice some amount of contention or incoherency will occur. Plot 104 is an exemplary plot of a scaling scenario where contention is present. Similar to plot 102, plot 104 is a representation of system throughput measured against load in a system. For plot 104, the coherency factor ($\beta$) is 0 and the contention factor ($\alpha$) is significant. A significant contention factors implies that processors are waiting or queueing for shared resources while working concurrently. As the load on the system increases, the rate of increase of system throughput starts to decrease, as exhibited by the difference between line 112 (actual throughput) and the ideal line. Plot 106 is an exemplary plot of a scaling scenario where both contention and incoherency are present, which would most likely resemble an actual real-world example. In plot 106, due to contention and incoherency, total system throughput peaks, after which there are diminishing or negative returns (even when increasing the number of processors (load factor N)). Accordingly, in a conventional system, simply adding more processors starts yielding diminishing returns and/or negative system scaling.

For example, if 95% of the transactions for a table are queries, contention would be 0.05. Effective productivity of each server in a team of 10 would be 68.97%. Thus, a team of 10 may lose nearly one third of its capacity to contention in conventional systems.

However, using approaches discussed herein, diminishing returns can be minimized and negative system throughput avoided. For example, using reciprocal delta tables as disclosed herein, a system may impose additional overhead (e.g., 5%) using deltas, but may lower contention by an order of magnitude. Productivity of a single server acting alone would be about 95%, but productivity may hold up to, e.g., 90.9% for a team of 10. If additional system overhead is lowered to 1% and contention is lowered down two orders of magnitude, the net productivity may, e.g., rise to 97.6%.

An embodiment may use a branch construct, disclosed below. While a branch construct may add overhead to decompose and recompose branches, processing a branch may not introduce contention or coherence. For example, if an introduction of overhead of 10% provides contention and coherency of 0.05% and 01%, respectively, this may result in a system throughput of 29.7 with 50 servers or 44.1 with 100 servers.

Figure 2:
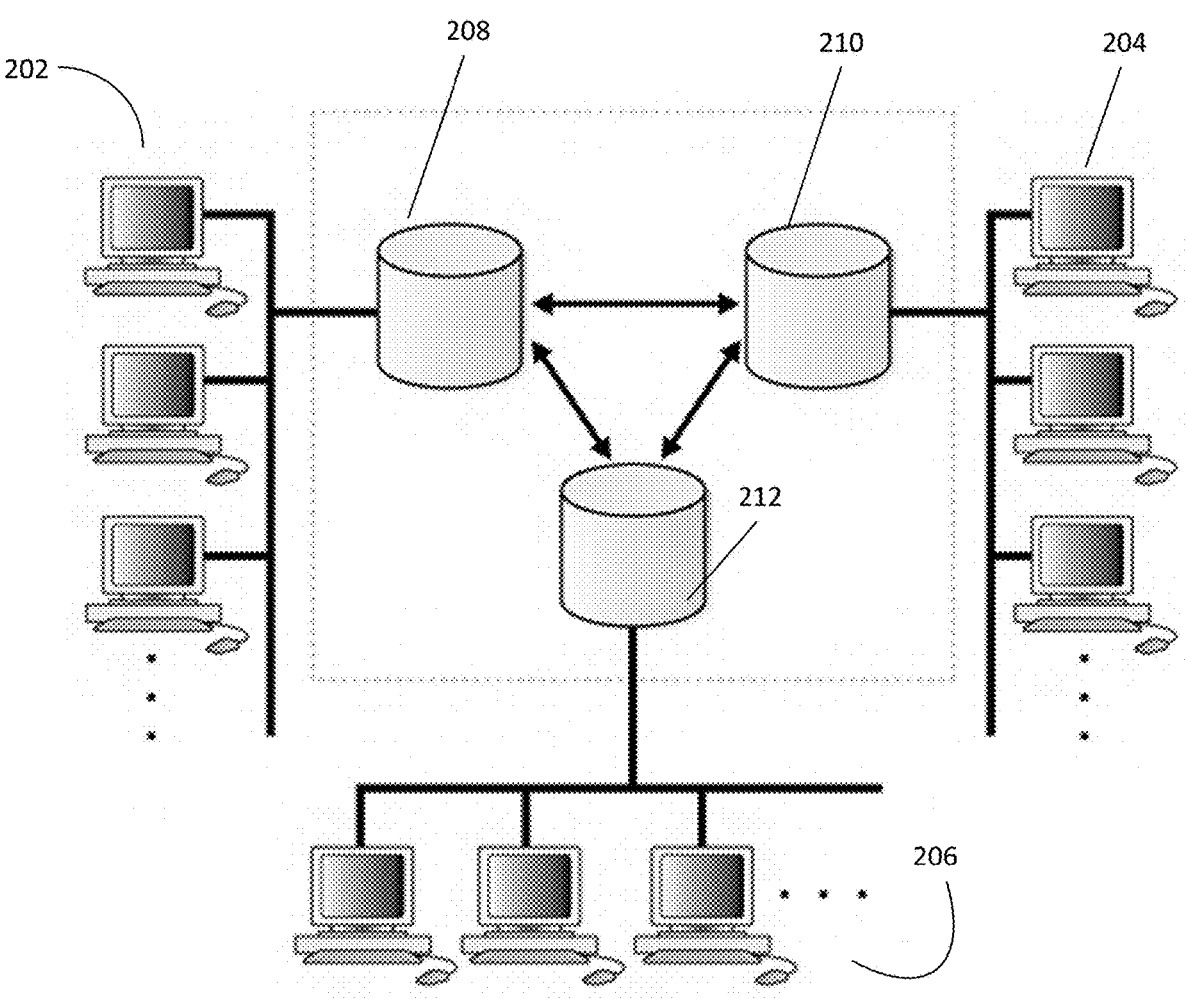
FIG. 2 shows a system diagram of a distributed network, in accordance with some embodiments described herein.

FIG. 2 depicts a system diagram of a distributed network, in accordance with some embodiments. For example, FIG. 2 depicts network 200, which includes numerous system components. System components may include client devices 202, 204, and 206 and servers 208, 210, and 212. Client devices 202, 204, and 206 and servers 208, 210, and 212 may be connected to each other over an internal network or an external network, e.g., the internet. In network 200, client device 202 may need to access and/or process a large dataset. To do so, client device 202, may distribute the task between servers 208, 210, and 212, so that each server may have a respective sub-task. It should be noted that, throughout this disclosure, processes performed by one system component may additionally or alternatively be performed by another system component. The system components of network 200 may, for example, work in parallel, in a distributed fashion, to perform cooperative processing using a common dataset.

In some embodiments, a dataset may be in the form of database table. Each record in a database table may consist of several cells. Cells of all records form the columns of a base state table of a database. In a conventional system, client device 202 may lock an initial state table of a database table while a task is run by servers 208, 210, and 212. As each server completes its subtask, the respective server generates a proposal. Once a proposal is executed (i.e., a proposal is committed) on the initial dataset, which now corresponds to the dataset after the sub-task of the respective proposal has been executed, a now-modified dataset may be released. System 200 then retrieves a next proposal in a queue, which corresponds to a next sub-task processed by a next client. Each proposal may, for example, be in the form of a delta table (e.g., a table that shows the changes with respect to an initial state table).

It should also be noted that embodiments herein may use any relational database management systems ("RDBMS"). For example, in an RDBMS, basic functions of relational database applications (e.g., software used to maintain a relational database) are "create," "read," "update," and "delete" (which are commonly abbreviated as "CRUD"). In SQL ("Structured Query Language"), a programming language designed for managing RDBMSs, these functions may, e.g., map to "insert," "select," "update," and "delete" applications. It should be noted that these functions may also be mapped to other relational database applications, including general purpose languages, and embodiments discussed herein may likewise be applied. For example, HTTP requests are used when accessing databases stored on the internet. HTTP requests may be mapped to basic "create," "read", "update," and "delete" operations. A create operation may be a PUT/POST request, a read operation may be mapped to a GET request, a modify request may be mapped to a combination of PUT/POST/PATCH requests and a delete operation may be mapped to a DELETE request. Similarly, in a RESTful API that uses HTTP requests, a create operation may be mapped to a POST request, a read (retrieve) operation may be mapped to a GET request, an update operation may be mapped to a PUT request, and a delete operation may be mapped to the DELETE operation. In another example, in the data distribution service language, a create, read, update, and delete operation may be mapped to, e.g., write, read/take, write, and dispose requests.

Prior to committing a proposal, each value for a proposed delta table, may be validated against a dataset of a state table. Once values have been validated, the proposed delta table may be committed and the values of the state table may be updated based on the values (e.g., proposed changes) of the delta table. The updated state table may be released to start a validation and combination process with another delta table. By working through a queue for each proposal, which corresponds to a respective sub-task, system 200 processes an overall task by using multiple parallel clients. In conventional systems, system 200 would allow a single server (e.g., 208) or client device (e.g., 202) to lock the table and prevent other client devices (e.g., 204 or 206) or servers (e.g., 210 or 212) from accessing and/or modifying the table while it is locked. While conventional systems may improve service by adding multiple servers and developing appropriate practices to coordinate among the servers efficiently, in order to update the table, server 208 must block all other servers while modifying a table. If server 208 did not block other servers, another server (e.g., server 210) may access or read an obsolete version of the table.

An embodiment may improve over the conventional systems by using "private" delta tables that may allow a state table to remain unlocked. Delta tables may be private, for instance, in that private delta tables are not necessarily common to all system components. For example, a system component (e.g., client device 202) may maintain, receive, and process delta tables for a specific task, using the most current state table information that is common to the system without locking the current state table or otherwise preventing other system components from accessing the current state table. For example, by using a private delta table, data can be copied from a state table to support a task of server 208. After completing a task, a private delta table may be created, without delaying tasks of server 204 or server 206. By not delaying tasks of server 204 and 206 while a private delta table is created by server 208 (e.g., by locking the state table), contention of system 200 is lowered. Furthermore, as opposed to creating an entire private system (e.g., featuring private delta tables and a private state table), private delta tables as described may be incorporated into a common state table in an efficient and convenient manner.

For example, before system 200 combines a private delta table with a state table, system 200 validates changes proposed in the private delta table. In a conventional system where the state table was not locked, other system components (e.g., servers 204 or 206) may have introduced changes to the state table after server 208 began its task. Therefore, records that a proposal of server 208 intends to change may have been modified. Conventional relational database systems do not have a mechanism to determine whether a record that, e.g., server 208 intends to modify (or delete), has been changed.

An exemplary embodiment depicted in system 200 may overcome shortcomings of the conventional systems by using a reciprocal delta table (e.g., a delta table that indicates an initial value of a record). A reciprocal delta table is one that is invertible (e.g., using a revert role). With a revert role, a reciprocal delta table may be self-validating, as a delta table itself indicates an original value of a record in the state table, and a state table therefore does not need to be compared. Thus, by using the reciprocal delta table, a system (e.g., server 208 or client device 202) can validate its delta table. In some embodiments, a reciprocal delta table may be a traditional delta table that contains an extra role (shown as, e.g., a column in FIGS. 4-6) that indicates whether that record represents a create, delete, or update to a state table. An ability to validate private delta tables allows system components to use algebraic functions disclosed and realize scalability gains such as those discussed above in relation to FIG. 1. For instance, an individual system component, receiving private delta tables from multiple sources (e.g., servers 208, 210, and 212) may use algebraic functions to combine those delta tables.

Figure 3:
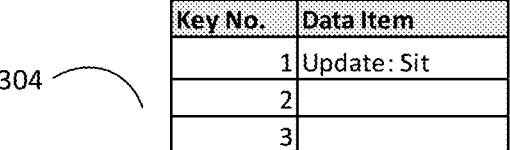
FIG. 3 shows exemplary delta table changes made to a state table of a database by means of a delta table, in accordance with some embodiments of less efficient approaches.

FIG. 3 depicts changes made to a state table of a database by means of a delta table, in accordance with some embodiments of less efficient approaches (e.g., using a delta table that lacks a revert role). FIG. 3 depicts state table 300, which has three exemplary records, each corresponding to an index key. For example, each index key represents a field with a unique value per record. When comparing two tables, what binds the changes together is that the key is unchanged. Record 302 of state table 300 currently has a value of "Lorem." Delta table 350 indicates change 304 proposed to state table 300. For example, change 304 indicates that record 302 should be updated to a value of "Sit." It should be noted that delta table 350 is shown with three records, two of which do not contain values; however, in some embodiments, a delta table may include only records corresponding to rows of the state table that need to be modified (e.g., via an insert, update, delete operation).

For example, the first row of delta table 350 includes an "Update: Sit." This means that delta table 350 proposes that the data item of the first row of state table 300, which currently has the word "Lorem," be updated to the word "Sit." Delta table 350 does not include records for any other rows corresponding to state table 300, which implies that delta table 350 does not propose modifying any record of the state table 300 apart from record 302. In such a system, a Cartesian product of two Booleans (e.g., appearance Boolean and persistence Boolean) can use only composite values 0, 1, and 2 representing create, delta, and update, respectively.

Figure 4:
FIG. 4 depicts an exemplary delta table with a revert role, in accordance with some embodiments described herein.

FIG. 4 depicts an exemplary delta table with a revert role, in accordance with some embodiments described herein. In order to increase efficiency of a relational database system, a novel "revert" role may be added to a conventional delta table. A "revert" role represents an inverse of an operation proposed in the delta table. For example, delta table 400 is identical to delta table 300, except that delta table 400 has an additional role 404. Role 404 indicates the original value of a record (e.g., as found in an initial state table of the database). As shown in FIG. 4, role 404 for the first record of delta table 400 indicates that the original value of that record was "Lorem" (e.g., as shown in FIG. 3). For example, FIG. 4 depicts a reciprocal delta table that comprises a record comprising a first cell and a second cell, wherein the first cell has a first value and the second cell has a second value, the first value being a delta to a state table (e.g., "Sit"), and the second cell being an original state of the state table (e.g., "Lorem").

The revert role may be captured in a delta table in numerous ways, depending on the manner in which a delta table is depicted. For example, if a traditional delta table is formatted as a set of three tables, with each table corresponding to a specific role (e.g., "create," "delete," and "update"), a reciprocal delta table may be formatted as an additional table with a table corresponding to the specific role of "revert." That is, the reciprocal delta table may be composed of a set of four tables, with each table corresponding to one of "create," "delete," "update," and "revert," respectively. In an example, a reciprocal delta table may comprise a pair of tables including a first table and a second table, wherein each cell that is included in the first table corresponds to a cell included in the second table, and wherein each row of the second table corresponds to either a delete role or a revert role and wherein each row of the first table corresponds to either a create role or an update role. The first table may comprise a first cell, and a second table may comprise a second cell, wherein the first cell has a new value and the second cell has an old value, and wherein the first value indicates a delta to the initial state table and the second value indicates an original value in the initial state table.

It should be noted that in some embodiments, delta tables and/or reciprocal delta tables may be converted from one format to another. It should be further noted that embodiments and examples with respect to a delta table and/or a reciprocal delta table can also be expressed, and should apply to, a delta table and/or reciprocal delta table in another format. For example, if a traditional delta table is formatted as a single table, the reciprocal delta table may be formatted with extra rows capturing the "revert" role (e.g., the first cell and the second cell may correspond to a single record in a single reciprocal delta table). In another example, if a traditional delta table is formatted as a single table that includes at most one value for each cell, the reciprocal delta table may include an additional value for that cell (e.g., the reciprocal delta table may comprise a single table with dual values for each cell).

In some embodiments, before committing modifications to a state table (e.g., state table 300) that are proposed by a delta table (e.g., delta table 400), the modifications may be first validated. In some embodiments, validation processes for different kinds of operations suggested by delta tables are performed by a database server (e.g., server 208) that receives modifications. As discussed above, there are four general operations, such as "create," "read," "update," and "delete." A create operation may create a record that does not already exist. Therefore, the validation process for a create operation involves determining that a record does not exist. A create operation is performed when the database server determines that a record being created does not already exist. Similarly, a read operation to access a record may be performed if a record exists. The validation process to read/select a record involves determining that a record being selected exits. A similar validation test is performed before deleting a record. A delete operation will be performed when a database server determines that a record being deleted exists. Deleting a record that does not exist will result in error. For an update operation, a validation step has two checks. First, the record must exist. A record may be updated only if it exists. Second, the current value of the record being updated must match a "previous value" that accompanies an update record. The presence of a revert role in delta table 400 allows a server (e.g., server 208) or client device (e.g., client device 202) to self-validate. That is, a server does not need to lock the state table to validate its delta table.

For example, before the changes proposed by delta table 400 are combined into an initial state table (e.g., state table 300), a system (e.g., via a server or client device) validates an update operation. In the first step of validating of delta table 400, a system determines that the first record of the state table exists. In the second step, the system compares the previous value of record 402 (e.g., as indicated by role 404) stored in delta table 400 with the value of the corresponding record (e.g., record 302) of the state table (e.g., state table 300). As the value indicated by role 404 for record 402 of delta table 400 ("Lorem") matches the value of the corresponding record (record 302) of state table 300 ("Lorem"), the system may overlay state table 300 with delta table 400.

As discussed above, using a revert cell allows for a delta table to become invertible. That is, including a "revert" role creates a reciprocal delta table. A reciprocal delta table may have the same schema as its state table with an operator cell appended (as shown in FIG. 3). The operator cell contains the outer product of an appearance Boolean and a persistence Boolean. Each key of a state table composed with the operator cell is a key of a reciprocal delta table. A reciprocal data table is derived from a conventional delta table by splitting each update record into delete and insert components. A key property of a reciprocal delta is that a reciprocal delta contains its own inverse. A table is inverted by toggling an existence flag.

In some embodiments, a reciprocal delta table may be a traditional delta table that contains an extra role (e.g., shown as a column in FIGS. 4-6) that indicates whether that record represents a create, delete, or update to a state table. For example, as opposed to a conventional system in which a delta table includes three roles, a reciprocal delta table includes a fourth role: revert.

In some embodiments, this could be achieved by splitting the extra column into two yes/no queries. A first query may be whether this record version was written by a system component (e.g., server 208 or client device 202)—e.g., an appearance Boolean. The second query may be whether a record version was written by both server 208 and a client device 202—e.g., a persistence Boolean. The composite values 0, 1, and 2 may represent create, delta, and update, respectively. A final value, 3, may represent a revert role and is not used in conventional systems. Notably, an approach including a reciprocal delta table will be compatible with any pre-existing state table or RDBMS. An ability to adapt a system to the schema of the state table provides enhanced flexibility and allows a system to be quickly and efficiently adapted to preexisting state tables and database management systems.

Figure 5:
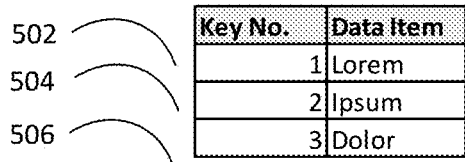
FIG. 5 shows the combination of two reciprocal delta tables algebraically, in accordance with some embodiments described herein.

FIG. 5 shows the combination of two reciprocal delta tables algebraically through use of a revert role. For example, using a revert role, a system may combine delta tables algebraically to create a smaller subset of delta tables to combine with a state table. For example, FIG. 5 depicts state table 500. The value of record 502 of state table 500 is "Lorem." The value of record 504 of state table 500 is "Ipsum." The value of record 506 of state table 500 is "Dolor." Also shown in FIG. 5 are delta table 510 and delta table 520. For delta table 510, the value of record 502 has been updated to "Sit." For delta table 520, the value of record 504 has been updated to "Amet." In some embodiments, the value stored in a revert role may be used to validate operations proposed by delta tables 510 and 520 before changes are proposed to state table 500. As described above, a validation process for updating a record of state table 502 requires determining that the record exists and that value of the record of the state table matches the original value of the record that accompanies with the update operation (e.g., the revert role value in this case).

In FIG. 5, delta table 510 and delta table 520 indicate a change to record 502 and record 504, respectively. In systems using less efficient approaches, these changes may be applied in series. For instance, first, delta table 510 would be proposed, validated, and combined with state table 500. After that, delta table 520 would be proposed, validated, and combined with state table 500. When combining delta table 510 and delta table 520 in conventional systems, state table 500 would need to be locked during the combination.

Using a revert role of a reciprocal delta table, delta tables 510 and 520 may be combined without locking state table 500 because the revert role may be used to validate proposed modifications. For example, a system can determine that there is no conflict when combining delta table 510 and 520 because the value of the revert role of record 502 in delta table 510 is "Lorem" and the value of the record in delta table 520 of record 502 is also "Lorem." Likewise, a system can determine that the value of the revert role of record 504 in delta table 520 is "Ipsum" and the value of the record in delta table 510 of record 504 is also "Ipsum." That is, a revert role may also allow validation of a combination of delta tables.

Accordingly, without a need for time-stamps, version numbers, and/or locking of the state table 502, the system may combine delta table 510 and delta table 520 into a single combined delta table 530. Delta table 530 includes changes proposed by both 510 and 520, as shown by its proposed changes to records 502 and 504, respectively. Now, to update state table 500 with changes of delta tables 510 and 520, state table 500 only needs to be combined with delta table 530. Modified state table 540 may be generated according to:

Modified State Table=Initial State Table+Combined
Delta Table

Therefore, a system must unlock state table 500 during a combination with a single table (i.e., delta table 530) as opposed to multiple delta tables (i.e., delta table 510 and delta table 520). In fact, as long as delta tables are stored, each committed modification does not need to change the initial state table. That is, a system is recursive such that every state of a table could be represented by induction, which is beneficial for archiving, error correction, and system recoveries (e.g., in the instance of a system crash and/or data loss). For instance, a system can represent every state with an empty state table and a complete set of delta tables. This may further reduce the number of operations needed to be processed and may save time. The present state of a state table can then be expressed through a series of algebraic equations, for example:

$$\text{Delta Table } 530 = \text{Delta Table } 510 + \text{Delta Table } 520$$

$$\text{Modified State Table } 540 = \text{State Table } 500 + \text{Delta Table } 530$$

Combining delta tables may continue until a conflict arises. For example, a system (e.g., client device 202) may receive a first combined delta table (e.g., comprising a combination of a delta table proposed by server 208 and server 204). This combined delta table may then itself be combined with another delta table (e.g., a delta table proposed by server 206) to create a further combined delta table. Additionally, after receiving delta tables proposed by server 208 and server 204, a system (e.g., client device 202) may have assigned servers 202 and 204 new tasks. Delta tables proposed by servers 202 and 204, for these new tasks, may be combined with a further combined delta table.

FIG. 6 depicts an exemplary embodiment of detecting conflicts between two reciprocal delta tables, in accordance with some embodiments described herein. For example, when validating a combination of two delta tables, a system compares the value of the revert role of a record in a first reciprocal delta table to the record value of a second reciprocal delta table. In FIG. 6, delta table 610 and delta table 620 each indicate a change to record 602. Using the revert role of the reciprocal delta table, the system can validate a combination of delta tables 610 and 620 without locking state table 600 because the revert role may be used to validate the proposed modifications. However, in contrast to the example of FIG. 5, a system may determine that there is a conflict when combining delta table 610 and 620, because a value of the revert role of record 602 in delta table 610 is "Lorem" and the value of the record in delta table 620 of record 602 is "Vade."

Figure 7:
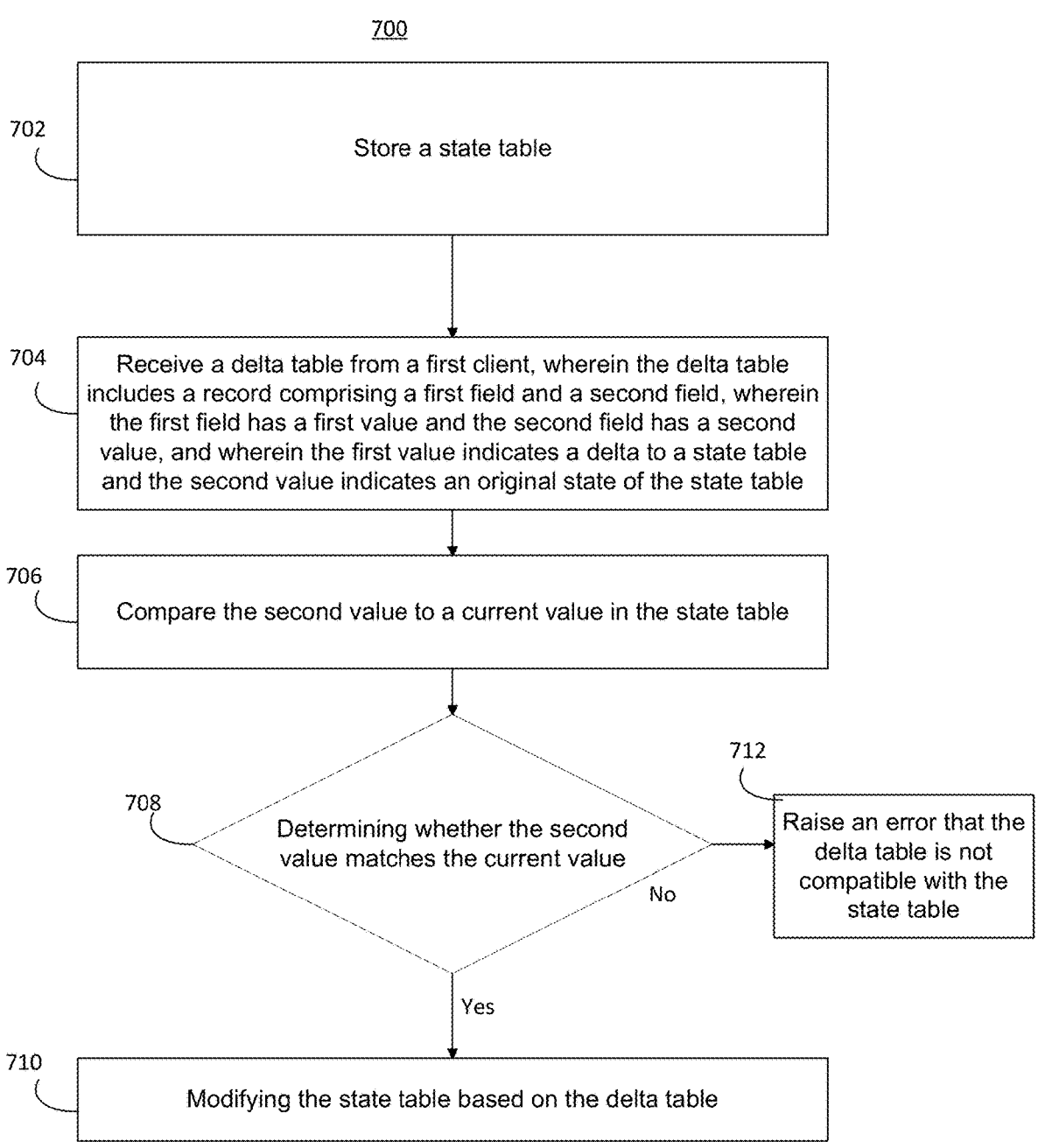
FIG. 7 depicts a logical diagram illustrating a process for updating a state table using a delta table as described in FIGS. 4-5, in accordance with some embodiments described herein.

FIG. 7 illustrates a process for updating a state table using a delta table, in accordance with some embodiments described herein. Process 700 shown in FIG. 7 may be executed using a reciprocal relational database and may be performed by any components in FIG. 2. At 702, a system (e.g., server 208 or client device 202) stores a state table. The state table may use any schema and/or use any RDBMS. At 704, a system (e.g., server 208 or client device 202) receives a delta table from a first client, wherein the delta table includes a record comprising a first cell and a second cell, wherein the first cell has a first value and the second cell has a second value, and wherein the first value indicates a delta to a state table and the second value indicates an original state of the state table. For example, client device 202 may receive a reciprocal delta table from server 208. A reciprocal delta table may include a record that includes a first cell that indicates a delta to a state table, and a second cell (e.g., the revert role) that indicates the original state of the state table.

At 706, a system (e.g., server 208 or client device 202) compares the second value to the current value of the state table. For example, while combining a reciprocal delta table (e.g., delta table 400) with a state table (e.g., as described in FIG. 4) or another delta table (e.g., as described in FIGS. 5-6), a system compares the second value to the current value in the state table.

At decision block 708, a system (e.g., server 208 or client device 202) determines whether the second value matches the current value. For example, as described in relation to FIG. 5, a system may determine that there is no conflict when combining delta table 510 and 520 because the value of the revert role of record 502 in delta table 510 is "Lorem" and the value of the record in delta table 520 of record 502 is also "Lorem." Alternatively, as described in relation to FIG. 6, a system may determine that there is a conflict when combining delta table 610 and 620 because the value of the revert role of record 602 in delta table 610 is "Lorem" and the value of the record in delta table 620 of record 602 is "Vade."

In response to determining that a second value matches the current value, a system (e.g., server 208 or client device 202) may modify the state table based on the delta table at step 710. For example, if a system determines that the second value matches the current value, the system may validate the record. Alternatively or additionally, a system may continue to validate any remaining records in the delta table. Validated record(s) may then be committed. A committed delta table may then be with a state table or a pointer to the delta table may be appended to the state table. For example, a system may assign a delta table a sequence number. A state table and a delta table with its sequence number may also be stored. An updated state table may be represented as a state table as modified by one or more delta tables (e.g., modification of the state tables by the delta table in order based on the respective sequence number of a delta table). A delta table with its sequence number may also be stored even after the delta table is combined with a state table. A delta table with its sequence number may have a high forensic value because it can be used to accurately reproduce any previous state of the state table in case the state table could become compromised.

In some embodiments, at step 710, a system (e.g., server 208 or client device 202) may determine a pointer that indicates the end of the state table (e.g., state table 300). For example, a pointer may be embedded into a column of a state table and point to a row in a database. A system could then redirect a pointer that indicates the end of the state table to the beginning of a delta table that is to be incorporated in the state table.

In response to determining that a second value does not match the current value, a system (e.g., server 208 or client device 202) may raise an error that delta table proposed is not compatible with the state table at step 712. If an error is raised, the delta table is not validated. The error may then be reviewed by an operator, the delta table may be removed from queue, and/or triggering other review as needed.

FIG. 8 illustrates an exemplary process for updating a state table using a plurality of delta tables as described in FIG. 5, in accordance with some embodiments described herein. At 802, a system (e.g., server 208 or client device 202) receives a plurality of delta tables for a state table, each delta table corresponding to a data processing performed concurrently (e.g., the time at which data processing used to generate each delta table on a respective server may have as least partially overlapped). In some embodiments, a plurality of delta tables may be received by a client device (e.g., client device 202) from different servers. In some embodiments, each server may be assigned a different sub-task of an overall task by a client device.

At 804, a system queues delta tables as delta tables are proposed. In some embodiments, delta tables may be queued based on the order in which they were received at a relational database. For example, a system (e.g., client device 202) may assign a sequence to each delta table proposal as it is received from a server (e.g., server 208).

At 806, a system (e.g., server 208 or client device 202) validates, based on a value in the state table for a respective record, two delta tables in a queue. For example, a system may compare a value indicated in a revert role for a respective record to a value for that respective record in the state table. A system may then determine whether or not a value indicated in the revert role for the respective record matches the value for that respective record in the state table. In response to determining that values match, the delta table may be validated.

At 808, a system (e.g., server 208 or client device 202) combines two validated delta tables to create a combined delta table. For example, a system (e.g., client device 202) may receive a first combined delta table (e.g., comprising, e.g., a combination of a delta table proposed by server 208 and server 204). A combined delta table may then itself be combined with another delta table (e.g., a delta table proposed by server 206) to create a further combined delta table. A combined delta table may include all the modifications from both delta tables as shown in FIG. 5.

At 810, a system (e.g., server 208 or client device 202) may validate, based on a value in the state table for the respective record, the combined delta table and the state table. For example, a system may compare a value indicated in a revert role for a respective record in the combined delta table to a value for that respective record in the state table. A system may then determine whether or not a value indicated in a revert role for a respective record matches the value for that respective record in the state table. In response to determining that the values match, the combined delta table may be validated.

At 812, a system (e.g., server 208 or client device 202) may combine a combined delta table and a state table to create a modified state table. For example, in response to validating a combined delta table, a system may combine the combined delta table and the state table as discussed in FIG. 5. For example, as discussed above and in FIG. 5, the modified State Table may be expressed by a series of equations:

$$Combined\ Delta\ Table = Delta\ Table\ 1 + Delta\ Table\ 2$$

$$Modified\ State\ Table = Initial\ State\ Table + Combined\ Delta\ Table$$

The efficiencies of a relational database may be improved by creating branches. Branching may allow a system to implement distributive processing. Each client device can determine how to coordinate multiple servers for its particular needs, independent of other client devices coordinating their respective processing. In order for client devices to coordinate multiple servers, client devices need to coordinate with different servers that may be storing various sub-tables of data that may need to be accessed for processing. Each client can coordinate with various servers independent of any needs and requirements of other clients.

A branch can be a sequence of deltas from an initial state. In some embodiments, a sequence of delta tables (e.g., delta tables 520 and 530 described in FIG. 5) may be considered a branch. In some embodiments, a system identifies a state of the state table by its branch sequence index, called, e.g., a snapshot. A branch sequence index is an algebraic expression indicating a sequence of delta tables combined with a given state table.

For example, after a Modified State Table is computed (i.e., a new state table based on the first and second delta tables is created), a system may receive more delta tables for incorporating into a state table. Branches may be created stemming from a Modified State Table for each different additional delta table received. These branches could further be expressed algebraically. For example, two branches could be created:

$$Branch\ 1 = Modified\ State\ Table + Delta\ Table\ 3$$

$$Branch\ 2 = Modified\ State\ Table + Delta\ Table\ 4$$

Branches 1 and 2 would represent respective branch sequences stemming from an initial state table in which the Modified Delta Table was then combined with one or more other delta tables (e.g., Delta Table 3, Delta Table 4, etc.). "Branch 1" and "Branch 2" may be considered branch snapshots.

In some embodiments, Branch 1 and Branch 2 could then be validated against each other and combined. A combination of two branches may be called a branch point and may define a relationship between two branches. For example, a relationship between the two branches may be expressed as:

$$Branch\ Point\ 1 = Branch\ 1 + Branch\ 2$$

Alternatively, or additionally, Branch 1 and Branch 2 could form a base state of another branch. For example, a relationship could be expressed as:

$$Modified\ State\ Table\ 2 = Branch\ 1 + Delta\ Table\ 5$$

A combination of delta tables may also be generalized to represent the difference between snapshots of different branches, if there is a common branch point in the ancestry of two branches. For example:

$$Modified\ State\ Table\ 3 = Branch\ Point\ 1 + Delta\ Table\ 6$$

$$Modified\ State\ Table\ 4 = Branch\ Point\ 1 + Delta\ Table\ 7$$

Delta tables may be combined into other delta tables to represent the difference between any two snapshots of a branch. In some embodiments, because modifications proposed by delta tables are consistent, delta tables may be combined with a composite of tables to represent a state table at any given snapshot. Accordingly, the difference (i.e., delta) between Modified State Table 3 and Modified State Table 4 could be expressed as:

Modified State Table 3 =

Modified State Table 4−Delta Table 7+Delta Table 6.

By expressing modifications to an initial state table through algebraic expressions, a system may enable performance improvements. A system may write a current sequence number for each delta table while each delta table is committed. A system then only needs to validate the state table against the delta tables that are committed after the recorded sequence value. Furthermore, cost of validation drops dramatically when a system compares records only where a modification occurred.

To reduce time that a server may need exclusive access to the state table, a pointer can be affixed to any branch to indicate to other servers how to obtain recent changes. When a server commits a branch, a pointer is placed on the state table instructing the client device to check the newly committed branch for updates. A server can then copy those changes into the state table without blocking other servers.

Through the use of these pointers a first server may begin updating a table and have a second server finish the update (e.g., by moving the point to indicate the point at which the first server stopped). It should be noted that any decrease in throughput of the system through use of pointers may be compensated by a decrease in frequency of stops to updating processes. The benefit of such a tradeoff increases as the number of client devices increases. For example, while use of pointers may impose extra burden on each client device, which may reduce serial performance, using pointers can reduce contention, which can improve scaling.

For example, to ensure ACID principles and to increase efficiency, branches can be managed by a system (e.g., server 208 or client device 202) first publishing a plan (e.g., a plan to combine multiple branches). A system (e.g., server 208 or client device 202) may then declare itself to be an implementor of a combination of multiple branches. If an implementor fails to confirm completion of the plan (i.e., the plan can be achieved without any conflicts), a privilege may be revoked and another client may assume control. By revoking a privilege if the implementor fails to confirm completion, a system can ensure that an implementor cannot damage a state table and/or a sequence of delta tables. For example, if an implementor is disconnected from a corresponding system, its role as an implementor will be revoked. By invoking this protocol, a system minimizes coordination delay to maximize scaling and provide fault tolerance: it allows a transaction to complete, at a loss of performance, if a processor fails.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. It should also be noted that the systems and/or methods described above May be applied to, or used in accordance with, other systems and/or methods.

What is claimed is:

1. A computer-implemented method of committing proposed changes to a relational database as branches to the relational database, the method comprising:

accessing, by control circuitry, a state table stored in non-transitory memory;

determining a first self-validating delta table based on a first proposed change to the state table at a first timestamp, wherein the first self-validating delta table comprises a first delta value equal to the first proposed change to the state table and a first revert value set to a first current value of the state table;

generating a first pointer to a first branch comprising the first self-validating delta table for the first proposed change to the state table;

determining a second self-validating delta table based on a second proposed change to the state table at a second timestamp, wherein the second self-validating delta table comprises a second delta value equal to the second proposed change to the state table and a second revert value set to a second current value of the state table;

generating a second pointer to a second branch comprising the second self-validating delta table for the second proposed change to the state table;

determining whether the first timestamp is before the second timestamp; and based on determining the first timestamp is before the second timestamp, placing on the state table, without locking the state table, the first pointer to the first branch indicating the first proposed change is committed to the state table.

2. The method of claim 1 further comprising:

determining whether there is a conflict with the first self-validating delta table and the second self-validating delta table without locking the state table; and based on determining there is no conflict with the first self-validating delta table and the second self-validating delta table, placing on the state table, without locking the state table, the second pointer to the second branch indicating the second proposed change is committed to the state table.

3. The method of claim 2, wherein the placing on the state table, without locking the state table, the first pointer to the first branch is performed by a first server and placing on the state table, without locking the state table, the second pointer to the second branch is performed by a second server different from the first server.

4. The method of claim 1 further comprising:

determining whether there is a conflict with the first self-validating delta table and the second self-validating delta table without locking the state table; and based on determining there is a conflict with the first self-validating delta table and the second self-validating delta table, providing a notification that there is conflict that needs to be resolved.

5. The method of claim 1 further comprising:

determining a third self-validating delta table based on a third proposed change to the state table at a third timestamp after the second timestamp, wherein the third self-validating delta table comprises a third delta value and a third revert value;

generating a third pointer to a third branch comprising the third self-validating delta table for the third proposed change to the state table;

determining whether there is a conflict with the second self-validating delta table and the third self-validating delta table without locking the state table; and based on determining there is no conflict with the second self-validating delta table and the third self-validating delta table, generating a combined branch by combining the third branch with the second branch, wherein the combined branch comprises a combined self-validating delta table.

6. The method of claim 5 further comprising:

determining whether there is a conflict with the first self-validating delta table and the combined self-validating delta table without locking the state table; and after determining there is no conflict with the first self-validating delta table and the combined self-validating delta table, placing on the state table, without locking the state table, the second pointer to the second branch and the third pointer to the third branch to indicate the second proposed change and the third proposed change are committed to the state table.

7. The method of claim 5 further comprising:

determining whether there is a conflict with the first self-validating delta table and the combined self-validating delta table without locking the state table;

based on determining there is a conflict with the first self-validating delta table and the combined self-validating delta table, providing a notification that there is conflict that needs to be resolved; and placing on the state table, without locking the state table, the second pointer to the second branch indicating the second proposed change is committed to the state table.

8. The method of claim 1, wherein the placing on the state table, without locking the state table, the first pointer to the first branch further comprises determining whether there is a conflict with the first self-validating delta table and the state table without locking the state table.

9. The method of claim 1 further comprising:

determining a fourth self-validating delta table based on a fourth proposed change to the state table at a fourth timestamp, wherein the fourth self-validating delta table comprises a fourth delta value and a fourth revert value;

generating a fourth pointer to a fourth branch comprising the second self-validating delta table for the fourth proposed change to the state table;

determining that the fourth timestamp and the second timestamp occur at a same time;

determining there is a conflict with the second self-validating delta table and the fourth self-validating delta table without locking the state table; and based on determining that the fourth timestamp and the second timestamp occur at a same time and there is a conflict with the second self-validating delta table and the fourth self-validating delta table:

(1) providing a notification that there is conflict that needs to be resolved; and (2) placing on the state table, without locking the state table, the fourth pointer to the fourth branch indicating the fourth proposed change is committed to the state table based upon the fourth self-validating delta table having a higher assigned sequence value.

10. The method of claim 1 wherein at least one of the first delta value, the first revert value, the second delta value, or the second revert value is a null value.

11. A computer-implemented method of committing proposed changes to a relational database as branches to the relational database, the method comprising:

accessing, by control circuitry, a state table stored in non-transitory memory;

determining a first self-validating delta table based on a first proposed change to the state table at a first timestamp, wherein the first self-validating delta table comprises a first delta value equal to the first proposed change to the state table and a first revert value set to a first current value of the state table;

generating a first pointer to a first branch comprising the first self-validating delta table for the first proposed change to the state table;

determining a second self-validating delta table based on a second proposed change to the state table at a second timestamp after the first timestamp, wherein the second self-validating delta table comprises a second delta value equal to the second proposed change to the state table and a second revert value set to a second current value of the state table;

generating a second pointer to a second branch comprising the second self-validating delta table for the second proposed change to the state table;

determining whether there is a conflict with the first self-validating delta table and the second self-validating delta table without locking the state table; and after determining there is no conflict with the first self-validating delta table and the second self-validating delta table:

placing on the state table, without locking the state table, the first pointer to the first branch indicating the first proposed change is committed to the state table; and placing on the state table, without locking the state table, the second pointer to the second branch indicating the second proposed change is committed to the state table.

12. The method of claim 11, wherein the placing on the state table, without locking the state table, the first pointer to the first branch comprises placing on the state table, without locking the state table, the first pointer to the first branch after determining, without locking the state table, there is no conflict with the first self-validating delta table and the state table.

13. The method of claim 11 further comprising placing on the state table, without locking the state table, the second pointer to the second branch after determining, without locking the state table, there is no conflict with the second self-validating delta table and the state table.

14. The method of claim 11, wherein the placing on the state table, without locking the state table, the second pointer to the second branch further comprises:

determining a third self-validating delta table based on a third proposed change to the state table at a third timestamp after the first timestamp, wherein the third self-validating delta table comprises a third delta value and a third revert value;

generating a third pointer to a third branch comprising the third self-validating delta table for the third proposed change to the state table;

determining whether there is a conflict with the second self-validating delta table and the third self-validating delta table without locking the state table;

based on determining there is no conflict with the second self-validating delta table and the third self-validating delta table, generating a combined branch by combining the third branch with the second branch, wherein the combined branch comprises a combined self-validating delta table;

determining whether there is a conflict with the first self-validating delta table and the combined self-validating delta table without locking the state table; and after determining there is no conflict with the first self-validating delta table and the combined self-validating delta table, placing on the state table, without locking the state table, the second pointer to the second branch and the third pointer to the third branch to indicate the second proposed change and the third proposed change are committed to the state table.

15. The method of claim 11, wherein the placing on the state table, without locking the state table, the second pointer to the second branch further comprises:

determining a fourth self-validating delta table based on a fourth proposed change to the state table at a fourth timestamp before the second timestamp, wherein the fourth self-validating delta table comprises a fourth delta value and a fourth revert value;

generating a fourth pointer to a third branch comprising the fourth self-validating delta table for the fourth proposed change to the state table;

determining, without locking the state table, whether there is a conflict with the second self-validating delta table and the fourth self-validating delta table;

based on determining there is a conflict with the second self-validating delta table and the fourth self-validating delta table, generating a notification that there is a conflict.

16. The method of claim 15 further comprising placing on the state table, without locking the state table, the fourth pointer to the fourth branch indicating the fourth proposed change is committed to the state table.

17. A computer-implemented method of committing proposed changes to a relational database as branches to the relational database, the method comprising:

accessing, by control circuitry, a state table stored in non-transitory memory;

determining a first self-validating delta table based on a first proposed change to the state table at a first timestamp, wherein the first self-validating delta table comprises a first delta value equal to the first proposed change to the state table and a first revert value set to a first current value of the state table;

generating a first pointer to a first branch comprising the first self-validating delta table for the first proposed change to the state table;

determining, without locking the state table, there is no conflict with the first self-validating delta table and the state table; and placing on the state table, without locking the state table, the first pointer to the first branch indicating the first proposed change is committed to the state table.

18. The method of claim 17, wherein accessing, by control circuitry, the state table stored in non-transitory memory further comprises:

determining a second self-validating delta table based on a second proposed change to the state table at a second timestamp after the first timestamp, wherein the second self-validating delta table comprises a second delta value and a second revert value;

generating a second pointer to a second branch comprising the second self-validating delta table and the second time index for the second proposed change to the state table; and the method further comprises:

determining whether there is a conflict with the first self-validating delta table and the second self-validating delta table without locking the state table; and placing on the state table, without locking the state table, the second pointer to the second branch indicating the second proposed change is committed to the state table based on determining there is no conflict with the first self-validating delta table and the second self-validating delta table.

19. The method of claim 17, wherein accessing, by control circuitry, the state table stored in non-transitory memory further comprises:

determining a third self-validating delta table based on a third proposed change to the state table at a third time index, wherein the third self-validating delta table comprises a third delta value and a third revert value;

generating a third pointer to a third branch comprising the third self-validating delta table and the third time index for the third proposed change to the state table;

wherein determining, without locking the state table, there is no conflict with the first self-validating delta table and the state table further comprises:

determining whether there is a conflict with the first self-validating delta table and the third self-validating delta table without locking the state table;

generating a combined branch by combining the third branch with the first branch, wherein the combined branch comprises a combined self-validating delta table, based on determining there is no conflict with the first self-validating delta table and the third self-validating delta table;

determining whether there is a conflict with the state table and the combined self-validating delta table without locking the state table;

placing on the state table, without locking the state table, the first pointer to the first branch and the third pointer to the third branch to indicate the first proposed change and the third proposed change are committed to the state table.

20. The method of claim 17, wherein accessing, by control circuitry, the state table stored in non-transitory memory further comprises:

determining a fourth self-validating delta table based on a fourth proposed change to the state table at a fourth time index, wherein the fourth self-validating delta table comprises a fourth delta value and a fourth revert value;

wherein determining, without locking the state table, there is no conflict with the first self-validating delta table and the state table further comprises determining whether there is a conflict with the first self-validating delta table and the fourth self-validating delta table without locking the state table; and wherein placing on the state table, without locking the state table, the first pointer to the first branch further comprises, based on determining there is a conflict with the first self-validating delta table and the fourth self-validating delta table, generating a notification that there is a conflict.

* * * * *